Patented June 7, 1932

1,862,270

UNITED STATES PATENT OFFICE

GERHARD KÄLLNER, OF JDA- UND MARIENHUTTE, NEAR SAARAU, GERMANY, ASSIGNOR TO "SILESIA" VEREIN CHEMISCHER FABRIKEN, OF JDA- UND MARIENHUTTE, NEAR SAARAU, SILESIA, GERMANY

PROCESS FOR STABILIZING NATURAL AND ARTIFICIAL TYPES OF CAOUTCHOUC

No Drawing. Application filed May 16, 1928, Serial No. 278,345, and in Germany June 2, 1927.

It is known that the ageing properties of rubber, particularly of vulcanized rubber are mostly poor. The physical properties of vulcanized rubber gradually change so that the tensile strength and the elongation, for instance, become very low which is probably due to oxidation and to the subsequent vulcanization which is effected by the action of free sulphur contained in the compound. It is very important that such injurious changes of the vulcanized rubber which are designated as "ageing" should be prevented or retarded as much as possible. (Confer Stevens, Journ. Soc. Chem. Ind. 35, No. 16, 1916.)

It has been found that the ageing of the vulcanized rubber can be prevented or retarded by the addition of products which are obtained by the action of polyhydroxy-aldehydes, especially aldoses, upon amines. The reaction products of amines with polysaccharides, such as milk sugar, or their hydrolytic splitting products, such as invert sugar on amines, can also be used. Various types of amines such as aniline, toluidine, xylidine, $\alpha$- and $\beta$-naphthylamine, m-tolylene diamine, urea or p-aminophenol, can be used for the manufacture of the said reaction products. In order to obtain the above mentioned reaction products of aldehydes and amines, the respective substances are caused to react, with or without the employment of catalysts by melting the said components together or also by using solvents. Thereby resin-like solid or plastic masses are obtained which are excellently adapted for preventing the ageing of vulcanized rubber, that is to say for its stabilization. The following reaction products may be mentioned as examples which are obtained by melting together the various components.

Product of the reaction of glucose upon naphthylamine, solid resin; product of the reaction of glucose upon aniline, solid; product of the reaction of glucose upon m-tolylene diamine, solid; product of the reaction of glucose upon urea, wax-like; product of the reaction of glucose upon m-toluidine, syrupy; product of the reaction of milk sugar upon $\alpha$-naphthylamine, solid; product of the reaction of invert sugar upon aniline, solid resin; product of the reaction of the invert sugar upon $\alpha$-naphthylamine, amorphous mass.

As a rule 1 molecule of glucose is allowed to act on 1 molecule of amine; in the case of diamines 2 molecules of glucose can be used.

The said products can be added at any suitable stage of the mixing of the rubber compound. They may be added for instance to the latex as a solution or added to the rubber on mixing rolls as a powder. It has been found that small amounts of the said products, for instance 0,5–1% are already sufficient for obtaining the stabilizing effect. The said products may be used alone or mixed together or mixed with other stabilizers. It is understood that all substances which are necessary for the vulcanization such as accelerators, sulphur etc. may also be incorporated into the rubber.

The efficiency of the above mentioned condensation products is evident from the following example:

A compound consisting of: 100 parts of Sm sheets, 4 parts of emarex (bitumen), 4 parts of sulphur, 40 parts of carbon black or gas black, 25 parts of ZnO, 1 part of diphenylguanidine, 1 part of MgO, was vulcanized on the one hand without addition, on the other hand with the addition to the extent of 1% of the amount of rubber of the reaction product of 1 molecule of glucose on 1 molecule of $\alpha$-naphthylamine and aged at 75° C. in the known manner.

After a vulcanization of 40 min. at 143° C. a vulcanizate with the following physical properties was obtained: without stabilizer 298 kg./cm.$^2$ tensile strength, 520% elongation; with stabilizer 285 kg./cm.$^2$ tensile strength, 550% elongation.

After ageing for 14 days at 70° C. the respective vulcanizates showed the following: without stabilizer 95,5 kg/cm.$^2$ tensile strength, 210% elongation; with stabilizer 152,0 kg./cm$^2$ ultimate strength, 310% extension.

What I claim is:—

A method for preventing the ageing of vulcanized rubber comprising the addition to the rubber compound of the reaction product of glucose and alpha-naphthylamine and then vulcanizing the said compound.

In testimony whereof I affix my signature.

DR. GERHARD KÄLLNER.